United States Patent
Imanari et al.

[11] Patent Number: 5,187,513
[45] Date of Patent: Feb. 16, 1993

[54] FOCUSING APPARATUS

[75] Inventors: Hitoshi Imanari, Kawasaki; Koshi Yoshibe, Yokohama, both of Japan

[73] Assignee: Nikon Corporation, Tokyo, Japan

[21] Appl. No.: 779,631

[22] Filed: Oct. 21, 1991

[30] Foreign Application Priority Data

Oct. 30, 1990 [JP] Japan .................................. 2-290905

[51] Int. Cl.$^5$ .............................................. G03B 3/10
[52] U.S. Cl. ................................................ 354/195.1
[58] Field of Search ........................ 354/195.1, 195.11; 359/676

[56] References Cited

U.S. PATENT DOCUMENTS

| | | | |
|---|---|---|---|
| 4,890,133 | 12/1989 | Ogawa et al. | 354/195.11 X |
| 4,908,647 | 3/1990 | Ueyama | 354/195.1 X |
| 4,937,602 | 6/1990 | Himuro et al. | 354/195.1 |

FOREIGN PATENT DOCUMENTS 63-23115  1/1988  Japan .

Primary Examiner—Michael L. Gellner
Assistant Examiner—Nicholas Tuccillo
Attorney, Agent, or Firm—Shapiro and Shapiro

[57] ABSTRACT

A focusing apparatus in which a photographing lens can be speedily moved to a desired focus position comprises a rotary barrel for causing the focusing optical system to move in the direction of the optical axis, a moving amount detecting device provided with a detecting section which detects the position of the focusing optical system by detecting the rotational position of the rotary barrel and for outputting moving amount detected signals, a storage device for storing a position of the focusing optical system to be set arbitrarily, a first detecting device for detecting the arbitrarily set position and for outputting detected signals, first and second instruction devices for issuing an instruction for storing the focusing optical system at the set position, for moving the focusing optical system to the set position, a first driving device for driving the storing device, first and second driving control devices for respectively controlling the first and second driving devices in accordance with instructions from the first and second instruction devices and detected signals from the first and second detecting devices, a second driving device for driving the focusing optical system to the set position, and a board having a detecting section for detecting a stored position and a detecting section disposed so as to detect the amount of the movement of the focusing optical system.

2 Claims, 3 Drawing Sheets

FOCUSING APPARATUS

BACKGROUND OF THE INVENTION

1. Field of the Invention

The present invention relates to a photographing lens focusing apparatus, and more particularly to a focusing apparatus which is capable of speedily moving a photographing lens to a desired focus position.

2. Related Background Art

According to a method disclosed in Japanese Patent Application Laid-open No. 63-23115 filed by the applicant of the present invention, a setting position corresponding to a position of a lens at a free position is stored beforehand and the lens is made to return to the stored position.

In the above-described prior art, in addition to the requirements that there be an electrical storing apparatus for storing the position of a photographing lens and a computing apparatus for determining the difference between the position of the storing apparatus and that of the photographing lens, there is also the requirement that the difference between the position of the storing apparatus and that of the photographing lens must be monitored at all times in order to put the difference computing apparatus in an operating state. Hence, the arrangement of the circuit of the apparatus becomes complex in construction, and there is a problem in that a power cell is consumed quickly because electric current is consumed due to the above monitoring.

The construction of a lens barrel of the above-described prior art will now be explained briefly. A photographing lens is held in a helicoid and moved in a direction of the optical axis by the rotational force of a driving motor transmitted via gears. The moving of the photographing lens is controlled by signals outputted in accordance with the rotation of a slit disk disposed on an output shaft of the driving motor. Therefore, if mechanical play (backlash) occurs between the helicoid and the gears, it is inevitable that a deviation occurs in the amount of the movement of the photographing lens with respect to the above signals.

SUMMARY OF THE INVENTION

Accordingly, an object of the present invention is to provide a focusing apparatus in which a difference computation by means of such a complex circuit as the one described above is not required.

To this end, according to the present invention, there is provided a photographing lens focusing apparatus comprising a rotary barrel 2 which is rotatable about an optical axis and causes, by the rotating thereof, a focusing optical system L to move in a direction of the optical axis, a moving amount detecting apparatus 4 provided with a detecting section 5a for detecting the position of the focusing optical system L by detecting the rotational position of the rotary barrel 2 and outputting a moving amount detected signal, a storing apparatus 7 for storing the set position of the focusing optical system L to be set arbitrarily, first detecting apparatuses 6, 6b and 6c for detecting the arbitrarily set position and outputting detected signals, first instruction apparatuses 101 and 100 for issuing an instruction for storing the focusing optical system L at the set position, first driving apparatuses 8, 8a and 7a for driving the storing apparatuses, a first driving control apparatus 100 for controlling the first driving apparatuses 8, 8a and 7a in accordance with the detected signals of the first detecting apparatuses 6, 6b and 6c, second detecting sections 5b and 5c for detecting the set position which has already been stored, second instruction apparatuses 102 and 100 for issuing an instruction for moving the focusing optical system L to the set position, second driving apparatuses 9, 9a, 2a and 104 for moving the focusing optical system L to the set position, a second driving control apparatus 100 for controlling the second driving apparatuses 9, 9a, 2a and 104 in accordance with the detected signals of the second detecting apparatuses 5, 5b and 5c, and a board 5, integrally fixed to the rotary barrel 2, which includes the detecting sections 5b and 5c, disposed in the second detecting apparatus, for detecting a stored position and the detecting section 5a for detecting the amount of the movement of the focusing optical system L.

In the focusing apparatus of the present invention, a difference computation for determining a difference between a stored position and the position of the focus optical system is not needed. Therefore, the difference between these positions is not monitored.

Since the focusing apparatus is provided with a board, integrally fixed to a rotary barrel, which includes both a detecting section, disposed in a second detecting apparatus, for detecting a stored position and a detecting section for detecting the amount of movement of a focusing optical system, any influence due to backlash is small. Thus, the focusing optical system can be controlled with a high degree of accuracy.

These and other objects, features and advantages of the present invention will become clear when reference is made to the following description of the preferred embodiments of the present invention, together with reference to the accompanying drawings.

DETAILED DESCRIPTION OF THE PREFERRED EMBODIMENTS

An embodiment of the present invention will be explained below with reference to FIGS. 1 to 3.

Figure 1:
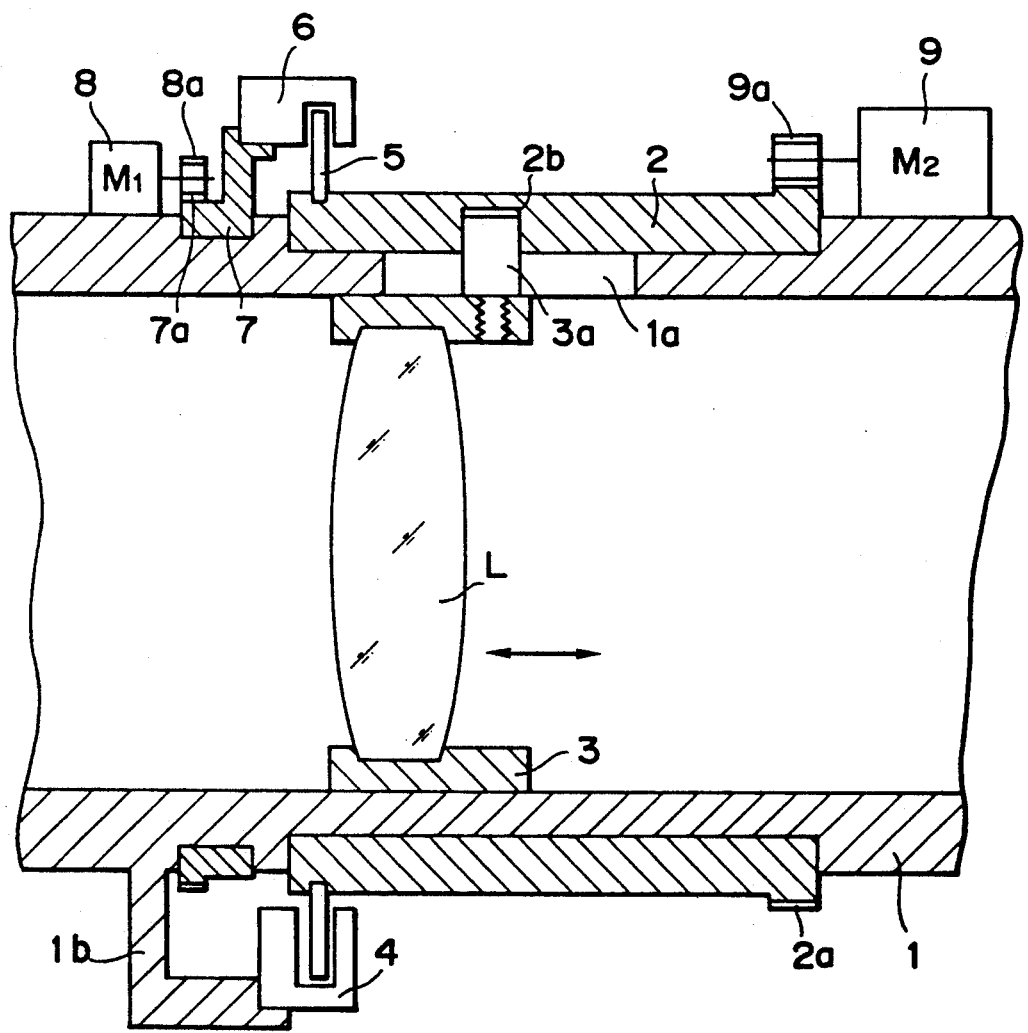
FIG. 1 is a longitudinal sectional view of a lens barrel of the present invention.

FIG. 1 is a longitudinal sectional view of an embodiment of a lens barrel of the present invention. FIG. 2 is a schematic view showing positioning patterns and a detecting section. FIG. 3 is a graph showing the relationship between the number of rotations of a driving motor before and after positioning and the distance of the movement of the detecting section relative to the pattern.

In FIG. 1, a focusing optical system L is disposed in order to be capable of moving along an optical axis. A projection 1b to which a straight-line movement guide groove 1a and a detecting section 4 are fixed is provided in a fixed barrel 1. A rotary barrel 2 is rotatably disposed on the outer surface of the fixed barrel 1, and has a lead groove 2b to which a glass plate 5 is fixed. A lens barrel 3 holds the focusing optical system L and is slidably disposed on the inner surface of the fixed barrel 1. A pin 3a is disposed in the lens barrel 3. The pin 3a is engaged with the lead groove 2b provided in the rotary barrel 2 which is rotatably engaged with the straight-line movement guide groove 1a of the fixed barrel 1 and the outer surface of the fixed barrel 1.

The detecting section 4 fixed to the fixed barrel 1 and the glass plate 5 having a slit pattern 5a fixed to the rotary barrel 2 constitute an incremental type encoder 105 as an apparatus for detecting the position of the focusing optical system L. Signals of the rotational direction and angle of the rotary barrel 2 are transmitted to a CPU 100 inside the lens by the encoder 105. A gear 2a is provided on the outer surface in the extreme right section of the rotary barrel 2 in FIG. 1. This gear 2a engages with a driving shaft gear 9a of a motor 9 for driving the focusing optical system L.

A rotary member 7 is disposed on the left side of the rotary barrel 2 in the figure so as to be rotatable to the fixed barrel 1. A photointerruptor 6 is integrally fixedly disposed on the extreme right section of the rotary member 7 in the figure. As shown in FIG. 2, the photointerruptor 6 together with positioning patterns 5b and 5c which are disposed on the radius of the glass plate 5, the positions of which patterns are different from that of the slit pattern, constitute an absolute type encoder. These encoders 5b and 5c detect the signals and transmit them to the CPU 100 inside the lens. A deviation in the accuracy will not occur when the focusing optical system is controlled because the glass plate 5 is integrally provided in the rotary barrel 2. That is, the system is not influenced by the play caused by backlash which occurs between the driving shaft 9a of the motor 9 and the gear 2a of the rotary barrel 2.

Such a system is easy to manufacture, because slit patterns used in incremental type encoders for AF driving control and other patterns for focus preset, go-home positioning, and speed control are provided on the glass plate which is integrally disposed on the rotary barrel 2 for driving the focusing optical system. The influence due to the play of a mechanism section is small because the detection system is not located near the driving motor shaft. Therefore, the focusing optical system can be controlled with a high degree of accuracy. A gear 7a is provided on the outer surface of the rotary member 7 in the extreme left section, which gear engages with a driving shaft gear 8a of a motor 8.

Figure 2:
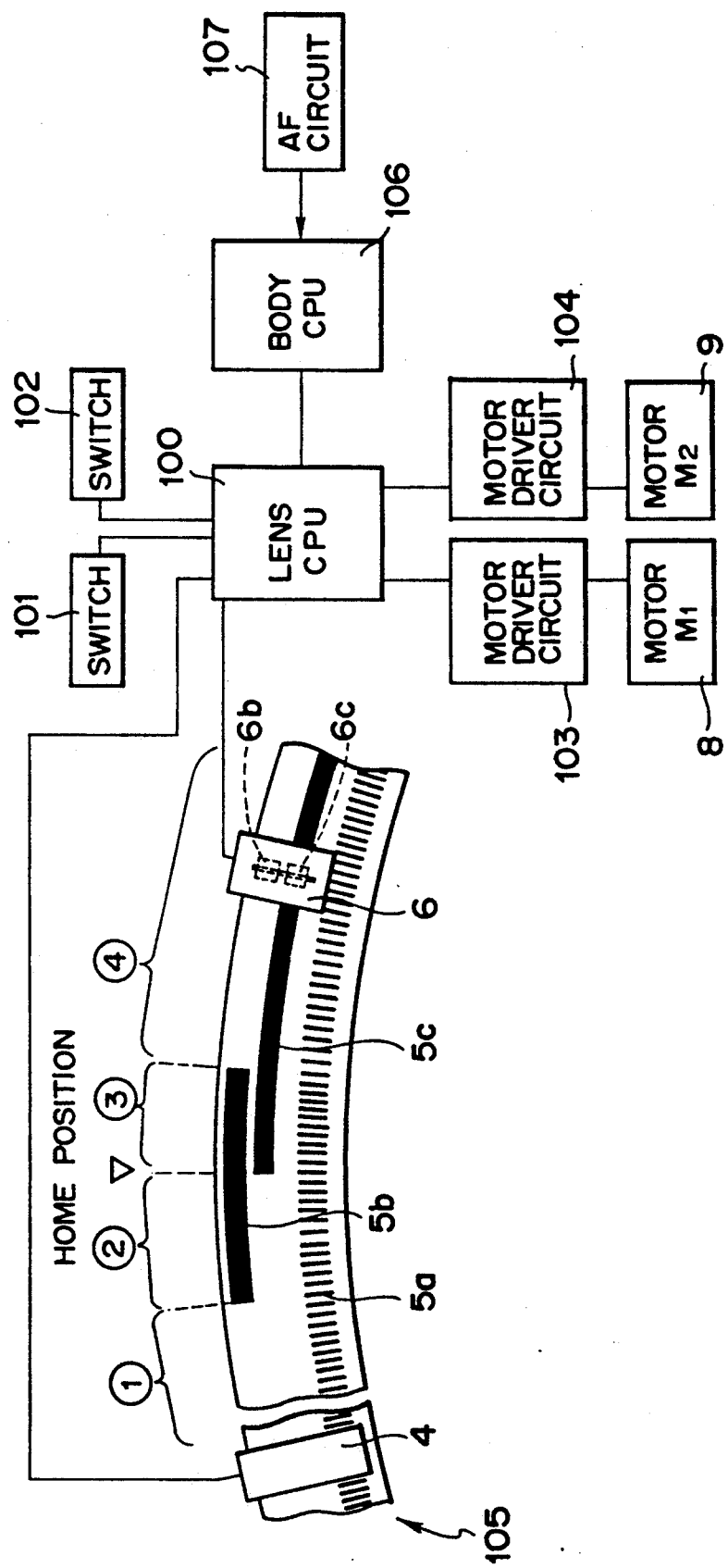
FIG. 2 is a schematic view showing positioning patterns and a detecting section.
Figure 3:
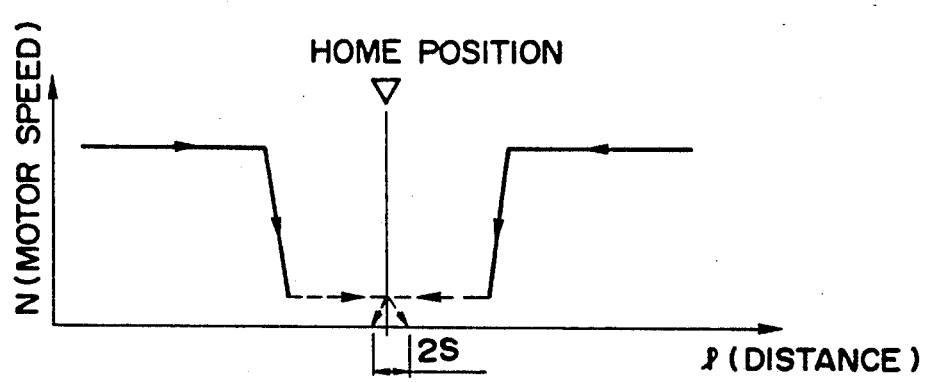
FIG. 3 is a graph showing the relationship between the number of rotations of a driving motor before and after positioning and the distance of the movement of the detecting section relative to the pattern.

FIG. 2 is a schematic view showing the system and positioning patterns 5b and 5c, and a photointerruptor 6 on the glass plate 5. The positions of the patterns 5b and 5c correspond to the positions of the two light-receiving sections 6b and 6c of the photointerruptor 6, respectively, on the same radius of the circumference. The pattern 5b for generating the output of the light-receiving section 6b is disposed at the positions ① and ④, excluding the positions before and after the home position ② and ③ in FIG. 2. The pattern 5c for generating the output of the light-receiving section 6c is disposed at the positions ① and ②. The total lengths of ① and ② and total lengths of ③ and ④ assures that the section within the rotary barrel 2 will rotate in order for the lens to move from infinity to the closest position.

In addition to the above, an instruction switch 101 for presetting the focus in order to store the focusing optical system L at a desired position and an instruction switch 102 for moving the lens to the home position (an arbitrarily stored position), i.e., for performing the so-called "go-home" function, are connected to the lens CPU in FIG. 2. Driving circuits 103 and 104 for controlling the driving of the motors 8 and 9, respectively, as well as the body CPU 106, are connected to the lens CPU 100. An AF circuit 107 for detecting the amount of deviation from the focal point is connected to the body CPU 106.

Next, the operation of the embodiment will be explained.

First, an explanation will be given about the normal AF function (automatic focusing). In this mode, the focusing optical system L is moved as much as the amount of the deviation from the focal point by the driving force of the motor 9 on the basis of the amount of the deviation from the focal point detected by the AF circuit 107, and the rotation of the motor 9 is transmitted via gears 9a and 2a to the rotary barrel 2. The rotation of the rotary barrel 2 causes the focusing lens L to move in the direction of the optical axis via the lead groove 2b, a straight-line movement groove 1a and a pin 3a disposed in a lens movement frame 3 which engages with these grooves. Whether the lens is moved as much as the amount of the deviation from the focal point is determined by the lens CPU 100 by signals from the encoder formed of the glass plate 5 and the detecting section 4 and performed by the motor driving circuit 104 on the basis of drive and stop instructions from the lens CPU 100.

The focus preset will now be explained. When a preset switch 101 is operated at a properly chosen position when the focus lens is at rest, the motor 8 is driven according to the position of the patterns 5b and 5c and the photointerruptor 6, causing the rotary member 7 and the photointerruptor 6 integral therewith to be rotated by the gears 8a and 7a. When the photointerruptor 6 is at ① of FIG. 2, it is set so that it is rotated at the fastest possible speed. When the photointerruptor 6 is at ② of FIG. 2, it is set so that it is rotated at the slowest possible speed. When the photointerruptor 6 is at ④ of FIG. 2, it is set so that it is rotated in a counterclockwise direction at the fastest possible speed. When the photointerrupter 6 is at ③, it is set so that it is rotated at the slowest possible speed. The photointerruptor 6 is set so that when it reaches the boundary between ② and ③ (the home position in FIG. 2), the motor 8 stops.

Since the rotation of the motor before and after stopping is set to a sufficiently low speed at position ② or ③, the amount which the photointerruptor 6 overruns the boundary between ② and ③ is very small. The amount of overrun S (see the graph in FIG. 3) of the photointerruptor 6 becomes sufficiently small enough when it is converted into the depth of field of the lens.

In this way, the photointerruptor 6 stops at the home position, thus completing the focus preset. Even when there is a go-home or AF action instruction, the lens CPU 100 is set so that it precludes these instructions, giving priority to the interrupt instruction signal of the focus preset.

Next, an explanation will be given about the "go-home" mode. When the go-home switch 102 is operated at other arbitrary focus lens positions after the focus preset is completed according to the above-described method, the motor 9 moves according to the positions of the patterns 5b and 5c and the photointerruptor 6. In contrast to that during the focus preset, the glass plate 5 provided with the patterns 5b and 5c rotates in accordance with the rotation of the rotary barrel 2 by the motor 9 by the same driving mechanism as in the AF mode. The rotational direction and rotational speed of the glass plate 5 are set so that the glass plate rotates in a counterclockwise direction at a speed nearly the same as for the driving during the AF mode when the photointerruptor 6 is at ① of FIG. 2. When the photointerruptor 6 is at ② FIG. 2, it is set so that it rotates at a speed as slow as possible. When the photointerruptor 6 is at ④ of FIG. 2, it is set so that it rotates in a clockwise direction at a speed nearly the same as for the driving during the AF mode. When the photointerruptor 6 is at ③, it is set so that it rotates in a clockwise direction at the slowest possible speed. The photointerruptor 6 is set in such a way that when it reaches the boundary between ② and ③ (the home position in FIG. 2), the motor 9 stops. The rotation of the motor before and after stopping is set at a sufficiently low speed at the position ② or ③. The amount of overrun S (see the graph in FIG. 3) of the glass plate 5 becomes sufficiently small enough when it is converted into the depth of field of the lens. In this way, the glass plate 5 stops at the home position, thus completing the go-home mode. In this system, while the go-home switch 102 is being operated, the lens is moved to the home position and the position of the lens is kept at the home position after the driving is completed. However, if the go-home switch 102 is turned off, the system is set so that it will return to the normal AF mode even if the lens has not been moved to the home position.

According to the focusing of the present invention, because computation for determining the difference between a stored position and the position of the focusing optical system is not needed, not only the arrangement of the circuit becomes simple, but also the difference between a stored position and the position of the focusing optical system is not monitored. As a result, a wasteful consumption of power can be avoided.

Specifically, because slit patterns used in an incremental type encoder for AF driving control and patterns for focus preset, go-home positioning, and speed control are provided on a glass plate which is integrally disposed on the rotary barrel 2 for driving the focusing optical system L, it is easy to manufacture. The influence due to play in the mechanism section is small because the detection system is not placed near the driving motor shaft. Therefore, the focusing optical system can be controlled with a high degree of accuracy.

Since the focusing apparatus is provided with a plate, integrally fixed to a rotary barrel, which includes both a detecting section, disposed in a second detecting apparatus, for detecting a stored position, and a detecting section for detecting the amount of the movement of the focusing optical system, the effect of a backlash is small. Thus, the focusing optical system can be controlled with a high degree of accuracy.

Many different embodiments of the present invention may be constructed without departing from the spirit and scope of the present invention. It should be understood that the present invention is not limited to the specific embodiments described in this specification, and is only limited in the appended claims.

What is claimed is:

1. A focusing apparatus, comprising:
   a rotary barrel, which is rotatable about the optical axis, for causing, by the rotating thereof, the focusing optical system to move in the direction of the optical axis;
   driving amount detecting means provided with a detecting section which detects the position of the focusing optical system by detecting the rotational position of the rotary barrel and for outputting moving amount detected signals;
   storage means for storing a position of the focusing optical system to be set arbitrarily;
   first detecting means for detecting the arbitrarily set position and for outputting detected signals;
   first instruction means for issuing an instruction for storing the focusing optical system at the set position;
   first driving means for driving the storing means;
   first driving control mean for controlling the first driving means in accordance with an instruction from the first instruction means and detected signals from the first detecting means;
   second detecting means for detecting the set position which has already been stored and for outputting detected signals;
   second instruction means for issuing an instruction for moving the focusing optical system to the set position;
   second driving means for driving the focusing optical system to the set position;
   second driving control means for controlling the second driving means in accordance with an instruction from the second instruction means and detected signals from the second detecting means, and
   a board having a detecting section, fixed integrally to the rotary barrel and disposed in the second detecting means, for detecting a stored position, and a detecting section disposed so as to detect the amount of the movement of the focusing optical system.

2. A focusing apparatus, comprising:
   a lens barrel having a focusing optical system;
   a rotary barrel which is rotatable around the lens barrel about an optical axis and moves the focusing optical system to the direction of the optical axis;
   a board, fixed integrally to the rotary barrel, for setting a desired focus position, which board has a home position;
   a detector which is movable along the board in order to detect the home position of the board;
   detector driving control means for setting the detector in the lens barrel in accordance with the position of the home position of the board when the focusing optical system is at a focus position; and
   rotary barrel driving control means for positioning the home position of the board in the detector set in the lens barrel by moving the rotary barrel in order to position the focusing optical system to the desired focus position.

* * * * *